US006943203B2

(12) United States Patent
Vanderlaan et al.

(10) Patent No.: US 6,943,203 B2
(45) Date of Patent: Sep. 13, 2005

(54) SOFT CONTACT LENSES

(75) Inventors: Douglas G. Vanderlaan, Jacksonville, FL (US); David C. Turner, Jacksonville, FL (US); Marcie V. Hargiss, Jacksonville, FL (US); Annie C. Maiden, Jacksonville, FL (US); Robert N. Love, Hyrum, UT (US); James D. Ford, Orange Park, FL (US); Frank F. Molock, Orange Park, FL (US); Robert B. Steffen, Jacksonville Beach, FL (US); Gregory A. Hill, Atlantic Beach, FL (US); Azaam Alli, Jacksonville, FL (US); John B. Enns, Jacksonville, FL (US); Kevin P. McCabe, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/957,299

(22) Filed: Sep. 20, 2001

(65) Prior Publication Data

US 2002/0107324 A1 Aug. 8, 2002

Related U.S. Application Data

(63) Continuation-in-part of application No. 09/652,817, filed on Aug. 30, 2000, now abandoned, which is a continuation-in-part of application No. 09/532,943, filed on Mar. 22, 2000, now abandoned, which is a continuation-in-part of application No. 09/414,365, filed on Oct. 7, 1999, now abandoned, which is a continuation-in-part of application No. 09/033,347, filed on Mar. 2, 1998, now Pat. No. 5,998,498.

(51) Int. Cl.$^7$ ................................. G02C 7/04
(52) U.S. Cl. ................. 523/107; 525/288; 525/299; 525/301; 525/303; 526/279; 528/32; 523/106
(58) Field of Search ................. 525/288, 299, 525/301, 303; 526/279; 528/32; 523/106, 107

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 3,854,982 A | 12/1974 | Aelion |
| 3,916,033 A | 10/1975 | Merrill |
| 4,113,224 A | 9/1978 | Clark et al. |
| 4,138,250 A | 2/1979 | Mueller et al. |
| 4,139,513 A | 2/1979 | Tanaka et al. |
| 4,153,641 A | 5/1979 | Deichert et al. |
| 4,182,822 A | 1/1980 | Chang |
| 4,189,546 A | 2/1980 | Deichert et al. |
| 4,197,266 A | 4/1980 | Clark et al. |
| 4,246,389 A | 1/1981 | LeBoeuf |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,321,889 A | 3/1982 | Michaelsen et al. |
| 4,327,203 A | 4/1982 | Deichert et al. |
| 4,343,927 A | 8/1982 | Chang |
| 4,355,147 A | 10/1982 | Deichert et al. |
| 4,414,372 A | 11/1983 | Farnham et al. |
| 4,417,034 A | 11/1983 | Webster |

(Continued)

FOREIGN PATENT DOCUMENTS

| | | |
|---|---|---|
| EP | 093/810399 | 12/1993 |
| EP | 0 940 693 A | 9/1999 |
| JP | 61123609 | 6/1986 |
| WO | WO91/04283 | 9/1990 |
| WO | WO91/10155 | 7/1991 |
| WO | WO 92/07013 A1 | 4/1992 |
| WO | WO 93/09154 A1 | 5/1993 |
| WO | WO96/31792 | 10/1996 |
| WO | WO 97/20852 A1 | 6/1997 |
| WO | WO00127662 | 4/2001 |

OTHER PUBLICATIONS

The Role of Bulky Polysiloxanylalkyl Methacrylates in Oxygen–Permeable Hydrogel Materials, J. Appl. Poly. Sci., vol. 56, 317–324 (1995).

Contact–Lens Related Case Studies Superior Epithelial Arcuate Lesions (Seal) 'Epithelial Splitting', Optician, Nov. 8, 1998, vol. 216, p. 30.

Photofile Part Three Superior Epithelial Arcuate Lesions, Optician, May 1995, vol. 209, p. 32.

Tanabe Yukio, Abstract of 'A case of dry eye with bilateral superior epithelial arcuate lesion', Abstract of DialogMed Document, File No. 5 accession No. 11530391.

"Photofile Part Three Superior Epithelial Arcuate Lesions, Optician," May 1995, vol. 209, p. 32.

Contact Lens Monthly, "Photofile Part Three Superior Epithelia Arcuate Lesions", No. 5500, May 5, 1995.

Contact Lens Monthly, "Superior Epithelia Arcuate Lesions (SEAL) Epithelial Splitting", vol. 216, No. 5676, Nov. 6, 1996.

Conway, H.D. et al., "The Effects of Contact Lens Deformation on Tear Film Pressure and Thickness during Motion of the Lens Towards the Eye", Journal of Biomechanical Engineering, vol. 105, pp. 47–50 (1983).

Gerry, P., "Bilateral Superior Epithelial Arcuate Lesions: A Case Report", Clinical and Experimental Optometry, Accepted for Publication Aug. 6, 1995 (Clin Ext Optom 1995; 78: 5: 194–195).

Kunzler, J.F., "Silicone Hydrogels for Contact Lens Application", Trend in Polymer Science, NL, Elsevier Science Publishers B.V. Amsterdam, vol. 4, No. 2, Feb. 1, 1996, pp. 52–59.

(Continued)

Primary Examiner—Kuo-Liang Peng

(57) ABSTRACT

A soft contact lens containing a silicone-hydrogel made by curing a reaction mixture containing a silicone-containing monomer.

24 Claims, No Drawings

| | | |
|---|---|---|
| 4,486,577 A | 12/1984 | Mueller et al. |
| 4,495,303 A | 1/1985 | Kuehl |
| 4,508,880 A | 4/1985 | Webster |
| 4,524,196 A | 6/1985 | Farnham |
| 4,543,398 A | 9/1985 | Bany et al. |
| 4,581,428 A | 4/1986 | Farnham |
| 4,588,795 A | 5/1986 | Dicker |
| 4,598,161 A | 7/1986 | Farnham |
| 4,605,712 A | 8/1986 | Mueller et al. |
| 4,605,716 A | 8/1986 | Hertler |
| 4,622,372 A | 11/1986 | Dicker |
| 4,656,233 A | 4/1987 | Hertler |
| 4,659,782 A | 4/1987 | Spinelli |
| 4,659,783 A | 4/1987 | Spinelli |
| 4,680,336 A | 7/1987 | Larsen |
| 4,681,575 A | 7/1987 | Tom |
| 4,681,918 A | 7/1987 | Webster |
| 4,695,607 A | 9/1987 | Spinelli |
| 4,703,097 A | 10/1987 | Wingler |
| 4,711,942 A | 12/1987 | Webster |
| 4,771,116 A | 9/1988 | Citrons |
| 4,837,289 A | 6/1989 | Mueller et al. |
| 4,871,785 A | 10/1989 | Froix |
| 4,889,664 A | 12/1989 | Kindt-Larsen |
| 4,910,277 A | 3/1990 | Bambury |
| 4,920,184 A | 4/1990 | Schafer |
| 4,954,586 A | 9/1990 | Toyoshima |
| 4,954,587 A | 9/1990 | Mueller |
| 5,002,794 A | 3/1991 | Ratner |
| 5,010,141 A | 4/1991 | Mueller |
| 5,018,849 A | 5/1991 | Su |
| 5,019,634 A | 5/1991 | Boettcher |
| 5,024,524 A | 6/1991 | Flasck |
| 5,034,461 A | 7/1991 | Lai |
| 5,039,459 A | 8/1991 | Kindt-Larsen |
| 5,057,578 A | 10/1991 | Spinelli et al. |
| 5,070,215 A | 12/1991 | Bambury |
| 5,079,319 A | 1/1992 | Mueller |
| 5,115,056 A | 5/1992 | Mueller |
| 5,258,490 A | 11/1993 | Chang |
| 5,260,000 A | 11/1993 | Nandu |
| 5,314,960 A | 5/1994 | Spinelli et al. |
| 5,314,961 A | 5/1994 | Anton et al. |
| 5,336,797 A | 8/1994 | McGee |
| 5,346,946 A | 9/1994 | Yokoyama et al. |
| 5,358,995 A | 10/1994 | Lai |
| 5,371,147 A | 12/1994 | Spinelli et al. |
| 5,387,632 A | 2/1995 | Lai |
| 5,387,662 A | 2/1995 | Kunzler |
| 5,401,508 A | 3/1995 | Manesis |
| 5,451,617 A | 9/1995 | Lai |
| 5,485,479 A | 1/1996 | Kitamura |
| 5,486,579 A | 1/1996 | Lai |
| 5,539,016 A | 7/1996 | Kunzler |
| 5,710,302 A | 1/1998 | Kunzler et al. |
| 5,714,557 A | 2/1998 | Kunzler et al. |
| 5,760,100 A | 6/1998 | Nicolson |
| 5,776,999 A | 7/1998 | Nicolson |
| 5,779,943 A | 7/1998 | Enns |
| 5,789,461 A | 8/1998 | Nicolson |
| 5,807,944 A | 9/1998 | Hirt et al. |
| 5,849,811 A | 12/1998 | Nicolson |
| 5,908,906 A | 6/1999 | Kunzler et al. |
| 5,944,853 A | 8/1999 | Molock |
| 5,958,440 A | 9/1999 | Burrell et al. |
| 5,959,117 A | 9/1999 | Ozark et al. |
| 5,962,548 A | 10/1999 | Vanderlaan |
| 5,965,631 A | 10/1999 | Nicolson et al. |
| 5,981,615 A | 11/1999 | Meija et al. |
| 5,981,675 A | 11/1999 | Valint, Jr. et al. |
| 5,998,498 A | 12/1999 | Vanderlaan |
| 6,020,445 A | 2/2000 | Vanderlaan |
| 6,039,913 A | 3/2000 | Hirt et al. |
| 6,087,415 A | 7/2000 | Vanderlaan |
| 2003/0109637 A1 | 6/2003 | Kunzler et al. |

OTHER PUBLICATIONS

Lai, Yu–Chin et al., "The Role fo Bulky Polysiloxanyalkyl Methacrylates in Polyurethane–Polysiloxane Hydrogels," J. of Appl. Poly. Sci., vol. 60, pp. 1193–1199 (1996).

Martin, D. et al., "Forces Developed Beneath Hydrogel Contact Lenses Due to Squeeze Pressure", Phys. Med. Boil., 1986, vol. 30, No. 6, pp. 635–649.

Epithelial Split Associated with Wear of a Silicone Hydrogel Contact Lens CLAO Oct. 2001, vol. 27 No. 4.

Group Transfer Polymerization, D. W. Webster, Encyclopedia of Poly. Sci. and Eng. (John Wiley & Sons) p. 588, 1987.

A. Domachke et al., "The Role of Polysiloxanylalkyl Methacrylates in Oxygen–Permeable Hydrogel Materials," Appl. Poly Sci., vol. 56, 317–324 (1995).

H.D. Conway et al., "The Effects of Contact Lens Deformation on Tear Film Pressure and Thickness During Motion of the Lens Twoards the Eye" Journal of Biomechanical Engineering, vol. 105 47–50 (1983).

SOFT CONTACT LENSES

RELATED U.S. APPLICATIONS

This application is a continuation-in-part of U.S. Ser. No. 09/652,817, filed on Aug. 30, 2000, now abandoned, which is a continuation-in-part of U.S. Ser. No. 09/532,943, filed on Mar. 22, 2000, now abandoned, which is a continuation-in-part of U.S. Ser. No. 09/414,365, filed on Oct. 7, 1999, now abandoned, which is a continuation-in-part of U.S. Ser. No. 09/033,347, filed on Mar. 2, 1998, now issued as U.S. Pat. No. 5,998,498.

FIELD OF THE INVENTION

This invention relates to silicone hydrogels. In particular, the invention relates to silicone hydrogels formed by curing a reaction mixture of silicone-containing monomers.

BACKGROUND OF THE INVENTION

A hydrogel is a hydrated crosslinked polymeric system that contains water in an equilibrium state. Hydrogels typically are oxygen permeable and biocompatible, making them preferred materials for producing biomedical devices and in particular contact or intraocular lenses.

Conventional hydrogels are prepared from monomeric mixtures predominantly containing hydrophilic monomers, such as 2-hydroxyethyl methacrylate ("HEMA") or N-vinyl pyrrolidone ("NVP"). U.S. Pat. Nos. 4,495,313, 4,889,664 and 5,039,459 disclose the formation of conventional hydrogels. The oxygen permeability of these conventional hydrogel materials relates to the water content of the materials, and is typically below 20–30 barrers. For contact lenses made of the conventional hydrogel materials, that level of oxygen permeability is suitable for short-term wear of the contact lenses; however, that level of oxygen permeability may be insufficient to maintain a healthy cornea during long-term wear of contact lenses (e.g., 30 days without removal). Therefore, efforts have been made and continue to be made to increase the oxygen permeability of conventional hydrogels.

One known way to increase the oxygen permeability of hydrogels is to add silicone-containing monomers to the hydrogel formulations to produce silicone hydrogels. Silicone-containing polymers generally have higher oxygen permeabilities than conventional hydrogels. Silicone hydrogels have typically been prepared by polymerizing mixtures containing at least one silicone-containing monomer and at least one hydrophilic monomer. Either the silicone-containing monomer or the hydrophilic monomer may function as a crosslinking agent (a crosslinking agent is a monomer having multiple polymerizable functionalities) or a separate crosslinking agent may be employed. The formation of silicone hydrogels has been disclosed in U.S. Pat. Nos. 4,954,587, 5,010,141, 5,079,319, 5,115,056, 5,260,000, 5,336,797, 5,358,995, 5,387,632, 5,451,617, 5,486,579, WO 96/31792, U.S. Pat. Nos. 5,789,461, 5,776,999, 5,760,100 and 5,849,811. Group Transfer Polymerization techniques for polymerizing acrylic and methacrylic monomers with terminal silyl containing monomers is described in various patents including U.S. Pat. Nos. 4,414,372, 4,417,034, 4,508,880, 4,524,196, 4,581,428, 4,588,795, 4,598,161, 4,605,716, 4,622,372, 4,656,233, 4,659,782, 4,659,783, 4,681,918, 4,695,607, 4,711,942, 4,771,116, 5,019,634 and 5,021,524 each of which is incorporated in its entirety herein by reference.

U.S. Pat. No. 3,808,178 discloses the formation of copolymers of small silicone-containing monomers and various hydrophilic monomers. U.S. Pat. No. 5,034,461 describes silicone hydrogels prepared from various combinations of silicone-polyurethane macromers and hydrophilic monomers such as HEMA or N,N-dimethyacrylamide ("DMA"). The addition of methacryloxypropyltris-(trimethylsiloxy)silane ("TRIS") reduced the modulus of such hydrogels, but in many examples the modulus was still higher than may be desired.

U.S. Pat. Nos. 5,358,995 and 5,387,632 describe hydrogels made from various combinations of silicone macromers, TRIS, NVP and DMA. Replacing a substantial portion of the silicone macromer with TRIS reduced the modulus of the resulting hydrogels. Two publications from the same author, "The Role of Bulky Polysiloxanylalkyl Methacrylates in Polyurethane-Polysiloxane Hydrogels", J. Appl. Poly. Sci., Vol. 60, 1193–1199 (1996), and "The Role of Bulky Polysiloxanylalkyl Methacrylates in Oxygen-Permeable Hydrogel Materials", J. Appl. Poly. Sci., Vol. 56, 317–324 (1995) also describe experimental results indicating that the modulus of hydrogels made from reaction mixtures of silicone-macromers and hydrophilic monomers such as DMA decreases with added TRIS.

The use of methacryloxypropylbis(trimethylsiloxy) methylsilane ("MBM") to make hard contact lenses was described in WO 9110155 and in JP 61123609.

When relatively high levels of bulky silicone-containing monomers such as TRIS are incorporated into the hydrogels made from silicone-containing macromers and hydrophilic monomers, time at which the polymer returns to its original shape after applied stress is relieved increases to an extent that is unacceptable to the contact lens wearer.

There still remains a need in the art for silicone hydrogels that are soft enough to make soft contact lenses, which possess high oxygen permeability, suitable water content, and sufficient elasticity, and are comfortable to the contact lens wearer.

SUMMARY OF THE INVENTION

This invention provides a silicone hydrogel prepared by curing a reaction mixture comprising either or both of the silicone-containing monomers of Structure I and II. Structure I has the following structure:

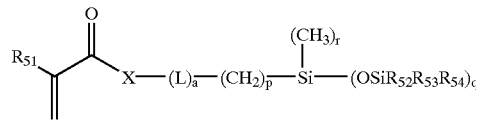

wherein $R_{51}$ is a monovalent group such as H, $C_{1-5}$ alkyl, or an ethylenically unsaturated moiety (such as styryl, $C_{1-5}$ alkenyl and the like) where H, $CH_3$ are preferred, q is 1, 2, or 3 and for each q, $R_{52}$, $R_{53}$, and $R_{54}$ are independently alkyl or aromatic, preferably ethyl, methyl, benzyl, phenyl, or a monovalent siloxane chain comprising from 1 to 100 repeating Si—O units, p is 1 to 10, r=(3−q), X is O or $NR_{55}$, where $R_{55}$ is H or a monovalent alkyl group with 1 to 4 carbons, a is 0 or 1, and L is a divalent linking group which preferably comprises from 2 to 5 carbons, which may also optionally comprise ether or hydroxyl groups, for example, a polyethylene glycol chain.

Structure II has the following structure:

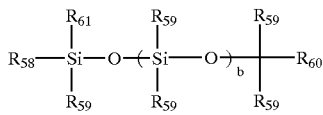

where b=0 to 100, where it is understood that b is a distribution having a mode equal to a stated value, preferably 8 to 10; $R_{58}$ is a monovalent group containing at least one ethylenically unsaturated moiety, preferably a monovalent group containing a styryl, vinyl, or methacrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl, and $R_{61}$ is independently alkyl or aromatic, preferably ethyl, methyl, benzyl, phenyl, or a monovalent siloxane chain comprising from 1 to 100 repeating Si—O units.

In the preferred embodiment, the silicone hydrogel comprises monomers of both Structure I and II. More preferably, the silicone hydrogel comprises silicone-containing monomer of Structure I and II and a hydrophilic monomer.

Among the advantages of this invention is that the use of the silicone-containing monomers of both Structure I and Structure II in a silicone hydrogel reduces the Young's modulus of the hydrogel especially in hydrogels which comprise these silicone-containing monomers and additional silicone-containing monomers which act as crosslinkers. The monomers of Structure I and II are more effective at lowering the modulus of the silicone hydrogel than for monomers described in the prior art. Additionally, the tan δ of the silicone hydrogels of this invention may be concurrently preserved.

The polymers produced according to this invention can be used to produce soft contact lenses that will provide high oxygen permeability, good elasticity, and can be produced economically and efficiently. The polymer of this invention can be used to make biomedical devices which require biocompatability and high oxygen permeability, preferably contact lenses.

DETAILED DESCRIPTION OF THE INVENTION AND PREFERRED EMBODIMENTS

The term "monomer" used herein refers to lower molecular weight compounds that can be polymerized to higher molecular weight compounds, polymers, macromers, or prepolymers. The term "macromer" as used herein refers to a high molecular weight polymerizable compound. Prepolymers are partially polymerized monomers or monomers which are capable of further polymerization.

A "silicone-containing monomer" is one that contains at least two [—Si—O—] repeating units in a monomer, macromer or prepolymer. Preferably, the total Si and attached O are present in the silicone-containing monomer in an amount greater than 20 weight percent, and more preferably greater than 30 weight percent of the total molecular weight of the silicone-containing monomer.

Examples of the silicone-containing monomers of Structure I that can be used to form silicone hydrogels of this invention are, without limitation, methacryloxypropylbis (trimethylsiloxy)methylsilane, methacryloxypropyltris (trimethylsiloxy)silane, methacryloxypropylpentamethyldisiloxane, and (3-methacryloxy-2-hydroxypropyloxy) propylbis(trimethylsiloxy)methylsilane. While such silicone monomers may additionally be used, linear mono-alkyl terminated polydimethylsiloxanes ("mPDMS") such as those shown in the following Structure II must be used:

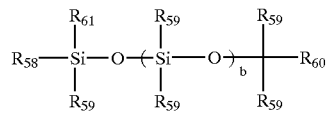

where b=0 to 100, where it is understood that b is a distribution having a mode equal to a stated value, preferably 4 to 16, more preferably 8 to 10; $R_{58}$ is a monovalent group containing at least one ethylenically unsaturated moiety, preferably a monovalent group containing a styryl, vinyl, or methacrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl; and $R_{61}$ is independently alkyl or aromatic, preferably ethyl, methyl, benzyl, phenyl, or a monovalent siloxane chain comprising from 1 to 100 repeating Si—O units.

The amount of mPDMS comprising the hydrogel is closely related to the modulus and tan δ of the hydrogels made according to this invention. Tan δ is defined as the loss modulus of the material divided by its elastic modulus (G"/G'). For purposes of this invention, modulus is defined as Young's modulus or it's equivalent tensile modulus where the measurement is recorded at the equilibrated hydrated state. It is desirable to lower both the modulus and tan δ in silicone hydrogel lenses for a number of reasons. First, lower modulus and tan δ in a lens are manifested as less stiffness, and after stress is relieved the lens quickly returns to its original shape. This improves comfort over traditional silicone hydrogel lenses and makes them more aesthetically appealing given their ability to retain their round shape. Further, the incidence of superior epithelial arcurate lesions ("SEALs") is either or both lessened and eliminated by using lenses made from a polymer having a sufficiently low modulus and tan δ. Thus, replacing lenses made from high modulus, high tan d polymers with those of the instant invention is a means for reducing or eliminating the occurrence of SEALs. This is particularly the case for contact lens wearers that are prone to SEALs.

Desirably, silicone hydrogels made according to the invention comprise between about 2 and 70% wt mPDMS based on total weight of reactive monomer components from which the polymer is made. Depending upon the other monomers present, this will generally reduce the modulus of the polymer to between about 20 and 180 psi and a tan δ of less than about 0.1 to no more than about 0.3 (measured at a frequency of 1 Hz and a temperature of 25° C., according to the method described in Example 21). Silicone hydrogels made according to the invention and comprising between about 4 and 50% wt mPDMS (same basis as above) are preferred. These will generally exhibit a modulus between about 30 and 160 psi and a tan δ of about 0.05 to about 0.3 (measured at a frequency of 1 Hz and a temperature of 25° C.). Silicone hydrogels made according to the invention and comprising between about 8 and 40% wt mPDMS (same basis as above) are most preferred. These hydrogels will generally exhibit a modulus between about 40 and 130 psi and a tan δ of about 0.2 or less (measured at a frequency of 1 Hz and a temperature of 25° C.). Hydrogels having tan δ less than about 0.1 can also be made according to this invention as described more fully below.

Additional silicone-containing monomers may be combined with the silicone-containing monomers of Structures I and II to form the soft contact lenses of the invention. Any known silicone-containing monomers useful for making silicone hydrogels can be used in combination with the silicone-containing monomer of Structure I and II to form the soft contact lenses of this invention. Many silicone-containing monomers useful for this purpose are disclosed in U.S. Pat. No. 6,020,445 incorporated herein in its entirety by reference. Useful additional silicone-containing monomers combined with the silicone-containing monomers of Structure I to form the silicone hydrogels of this invention are the hydroxyalkylamine-functional silicone-containing monomers disclosed in U.S. Pat. No. 5,962,548 incorporated herein in its entirety by reference. The preferred silicone-containing linear or branched hydroxyalkylamine-functional monomers comprising a block or random monomer of the following structure:

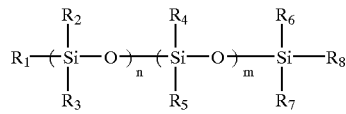

Structure III
wherein:
n is 0 to 500 and m is 0 to 500 and (n+m)=10 to 500 and more preferably 20 to 250; $R_2$, $R_4$, $R_5$, $R_6$ and $R_7$ are independently a monovalent alkyl, or aryl groups, which may be further substituted with alcohol, ester, amine, ketone, carboxylic acid or ether groups, preferably unsubstituted monovalent alkyl or aryl groups; and $R_1$, $R_3$ and $R_8$ are independently a monovalent alkyl, or aryl group, which may be further substituted with an alcohol, ester, amine, ketone, carboxylic acid or ether group, preferably unsubstituted monovalent alkyl or aryl groups, or are the following nitrogen-containing structure:

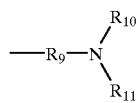

Structure IV
with the proviso that at least one of $R_1$, $R_3$, and $R_8$ are according to Structure IV, wherein $R_9$ is a divalent alkyl group such as —$(CH_2)_s$— where s is from 1 to 10, preferably 3 to 6 and most preferably 3;
$R_{10}$ and $R_{11}$ are independently H, a monovalent alkyl or aryl group which may be further substituted with an alcohol, ester, amine, ketone, carboxylic acid or ether group, or has the following structure:

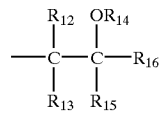

Structure V
where $R_{14}$, is H, or a monovalent polymerizable group comprising acryloyl, methacryloyl, styryl, vinyl, allyl or N-vinyl lactam, preferably H or methacryloyl; $R_{16}$ is either H, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam, preferably alkyl substituted with an alcohol or methacrylate; $R_{12}$, $R_{13}$ and $R_{15}$ are independently H, a monovalent alkyl or aryl, which can be further substituted with alcohol, ester, amine, ketone, carboxylic acid or ether groups, or $R_{12}$ and $R_{15}$, or $R_{15}$ and $R_{13}$ can be bonded together to form a ring structure, with the proviso that at least some of the Structure IV groups on the monomer comprises polymerizable groups. $R_{12}$, $R_{13}$ and $R_{15}$ are preferably H.

In alternative embodiments, the silicone hydrogels of this invention, comprising the silicone-containing monomers of either or both Structure I and Structure II may further comprise hydrophilic monomers. The hydrophilic monomers optionally used to make the hydrogel polymer of this invention can be any of the known hydrophilic monomers disclosed in the prior art to make hydrogels.

The preferred hydrophilic monomers used to make the polymer of this invention may be either acrylic- or vinyl-containing. Such hydrophilic monomers may themselves be used as crosslinking agents. The term "vinyl-type" or "vinyl-containing" monomers refer to monomers containing the vinyl grouping (—CH═$CH_2$) and are generally highly reactive. Such hydrophilic vinyl-containing monomers are known to polymerize relatively easily. "Acrylic-type" or "acrylic-containing" monomers are those monomers containing the acrylic group: ($CH_2$═CRCOX) wherein R is H or $CH_3$, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Hydrophilic vinyl-containing monomers which may be incorporated into the silicone hydrogels of the present invention include monomers such as N-vinyl lactams (e.g. NVP), N-vinyl-N-methyl acetamide, N-vinyl-N-ethyl acetamide, N-vinyl-N-ethyl formamide, N-vinyl formamide, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No.

5,070,215, and the hydrophilic oxazolone monomers disclosed in U.S. Pat. No. 4,910,277. Other suitable hydrophilic monomers will be apparent to one skilled in the art.

More preferred hydrophilic monomers which may be incorporated into the polymer of the present invention include hydrophilic monomers such as DMA, HEMA, glycerol methacrylate, 2-hydroxyethyl methacrylamide, NVP, polyethyleneglycol monomethacrylate, methacrylic acid and acrylic acid with DMA being the most preferred.

Other monomers that can be present in the reaction mixture used to form the silicone hydrogel of this invention include ultra-violet absorbing monomers, reactive tints, pigments, and the like. Additional processing aids such as release agents or wetting agents can also be added to the reaction mixture.

A polymerization initiator is preferably included in the reaction mixture. The polymerization initiator can be a compound such as lauryl peroxide, benzoyl peroxide, isopropyl percarbonate, azobisisobutyronitrile, or the like, that generates free radicals at moderately elevated temperatures, or the polymerization iniator can be a photoinitiator system such as an aromatic alpha-hydroxy ketone or a tertiary amine plus a diketone. Illustrative examples of photoinitiator systems are 2-hydroxy-2-methyl-1-phenyl-propan-1-one, and a combination of camphorquinone and ethyl 4-(N, N-dimethylamino)benzoate. The initiator is used in the reaction mixture in effective amounts, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. The preferred initiator is a 1:1 blend of 1-hydroxycyclohexyl phenyl ketone and bis(2,6-dimethoxybenzoyl)-2, 4, 4-trimethylpentyl phosphine oxide and the preferred method of polymerization initiation is visible light.

Typically after curing of the reaction mixture of the silicone-containing monomers of either or both Structure I and II and optional hydrophilic monomers and any other optional ingredients such as additional silicone-containing monomers, diluents, crosslinking agents, catalysts, release agents, tints etc. which are blended together prior to polymerization, the resulting polymer is treated with a solvent to remove the diluent (if used) or any traces of unreacted components, and hydrate the polymer to form the hydrogel. The solvent used may be water (or an aqueous solution such as physiological saline), or depending on the solubility characteristics of the diluent (if used) used to make the hydrogel of this invention and the solubility characteristics of any residual unpolymerized monomers, the solvent initially used can be an organic liquid such as ethanol, methanol, isopropanol, mixtures thereof, or the like, or a mixture of one or more such organic liquids with water, followed by extraction with pure water (or physiological saline) to produce the silicone hydrogel comprising a polymer of said monomers swollen with water. The silicone hydrogels after hydration of the polymers preferably comprise about 2 to 50 weight percent water, more preferably about 15 to 45 weight percent water, and most preferably about 20 to 40 weight percent water of the total weight of the silicone hydrogel. These silicone hydrogels are particularly suited for making contact lenses or intraocular lenses, preferably soft contact lenses.

In another preferred embodiment, a silicone hydrogel lens is made by reacting a macromer with a reaction mixture that includes silicone based monomers and hydrophilic monomers. This technique affords a high level of control of the structure of the ultimate product. Phase distribution can be controlled so that a more uniform coating or surface layer (if desired) can be applied to the lens. By "surface layer" is meant a distribution of material with a portion in contact with the environment and another portion in contact with a material having a different bulk property than that of the material from which the surface layer is formed. Additionally, it is easier to process the lenses because of greater uniformity of properties across the lens.

The macromers are made by combining a/an (meth) acrylate and a silicone in the presence of a Group Transfer Polymerization ("GTP") catalyst. These macromers typically comprise copolymers of various monomers. They may be formed in such a way that the monomers come together in distinct blocks, or in a generally random distribution. These macromers may furthermore be linear, branched, or star shaped. Branched structures are formed for instance if polymethacrylates, or crosslinkable monomers such as ethyleneglycol dimethacrylate are included in the macromer. Initiators, reaction conditions, monomers, and catalysts that can be used to make GTP polymers are described in "Group-Transfer Polymerization" by O. W. Webster, in Encyclopedia of Polymer Science and Engineering Ed. (John Wiley & Sons) p. 580, 1987. These polymerizations are conducted under anhydrous conditions. Hydroxyl-functional monomers, like HEMA, can be incorporated as their trimethylsiloxy esters, with hydrolysis to form free hydroxyl group after polymerization. GTP offers the ability to assemble macromers with control over molecular weight distribution and monomer distribution on the chains. This macromer is then reacted with a reaction mixture comprising predominantly polydimethylsiloxane (preferably, mPDMS), and hydrophilic monomers.

Preferred macromer components include mPDMS, TRIS, methyl methacrylate, HEMA, DMA, methacrylonitrile, ethyl methacrylate, butyl methacrylate, 2-hydroxypropyl-1-methacrylate, 2-hydroxyethyl methacrylamide and methacrylic acid. It is even more preferred that the macromer is made from a reaction mixture comprising HEMA, methyl methacrylate, TRIS, and mPDMS. It is most preferred that macromer is made from a reaction mixture comprising, consisting essentially of, or consisting of about 19.1 moles of blocked HEMA (2-(trimethylsiloxy)ethyl methacrylate) about 2.8 moles of methyl methacrylate, about 7.9 moles of TRIS, and about 3.3 moles of mono-methacryloxypropyl terminated mono-butyl terminated polydimethylsiloxane, and is completed by reacting the aforementioned material with about 2.0 moles per mole of 3-isopropenyl-ω,ω)-dimethylbenzyl isocyanate using dibutyltin dilaurate as a catalyst.

Silicone hydrogels can be made by reacting blends of macromers, monomers, and other additives such as UV blockers, tints, polymerization inhibitors, and internal wetting agents. Internal wetting agents are substances that are incorporated into the polymer blend of a lens prior to polymerization and due to their incorporation, the wettability of the lens increases. The reactive components of these blends typically comprise a combination of hydrophobic silicone with hydrophilic components. Since these components are often immiscible because of their differences in polarity, it is particularly advantageous to incorporate a combination of hydrophobic silicone monomers with hydrophilic monomers, especially those with hydroxyl groups, into the macromer. The macromer can then serve to compatibilize the additional silicone and hydrophilic monomers that are incorporated in the final reaction mixture. These blends typically also contain diluents to further compatibilize and solubilize all components. Preferably, the silicone based hydrogels are made by reacting the following monomer mix: macromer; an $Si_{8-10}$ monomethacryloxy terminated polydimethyl siloxane; and hydrophilic monomers together with minor amounts of additives and photoinitiators. It is more preferred that the hydrogels are made by reacting macromer; an $Si_{8-10}$ monomethacryloxy terminated polydimethyl siloxane; TRIS; DMA; HEMA; and tetraethyleneglycol dimethacrylate ("TEGDMA"). It is most preferred that the hydrogels are made from the reaction of (all amounts are calculated as weight percent of the total weight of the combination) macromer (about 18%); an $Si_{8-10}$ monomethacryloxy terminated polydimethyl siloxane (about 28%); TRIS (about 14%); DMA (about 26%); HEMA (about 5%); TEGDMA (about 1%), polyvinylpyrrolidone ("PVP") (about 5%); with the balance comprising minor amounts of additives and photoinitiators, and that the reaction is conducted in the presence of 20% wt 3,7-dimethyl-3-octanol diluent.

Various processes are known for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer in the approximate shape of the final desired product. Then, this polymer mixture is optionally treated with a solvent and then water, producing a silicone hydrogel having a final size and shape which are quite similar to the size and shape of the original molded polymer article. This method can be used to form contact lenses and is further described in U.S. Pat. Nos. 4,495,313; 4,680,336; 4,889,664; and 5,039,459, incorporated herein by reference. After producing the silicone hydrogel, the lens be may be coated with a hydrophilic coating. Some methods of adding hydrophilic coatings to a lens have been disclosed in the prior art, including U.S. Pat. Nos. 3,854,982, 3,916,033, 4,920,184, 5,002,794, 5,779,943, 6,087,415; WO 91/04283, and EPO 93/810,399.

The preferred range of the combined silicone-containing monomer of Structure II and additional silicone-containing monomers, if present in the reaction mixture, is from about 5 to 100 weight percent, more preferably about 10 to 90 weight percent, and most preferably about 15 to 80 weight percent of the reactive components in the reaction mixture. The preferred range of optional hydrophilic monomer if present in the above invention is from about 5 to 80 weight percent, more preferably about 10 to 60 weight percent, and most preferably about 20 to 50 weight percent of the reactive components in the reaction mixture. The preferred range of diluent is from about 0 to 70 weight percent, more preferably about 0 to 50 weight percent, and most preferably about 0 to 20 weight percent of the total reaction mixture. The amount of diluent required varies depending on the nature and relative amounts of the reactive components.

In a preferred combination of reactive components about 10 to 60, more preferably about 15 to 50 weight percent of the reactive components is silicone-containing monomer, about 20 to 50 weight percent of the reactive components is silicone-containing monomer of Structure I or Structure II, about 10 to 50 percent of the reactive components is a hydrophilic monomer, more preferably DMA, about 0.1 to 1.0 percent of the reactive components is a UV or visible light-active photoinitiator and about 0 to 20 weight percent of the total reaction mixture is a secondary or tertiary alcohol diluent, more preferably a tertiary alcohol.

The reaction mixtures of the present invention can be formed by any of the methods known to those skilled in the art, such as shaking or stirring, and used to form polymeric articles or devices by the methods described earlier. For some monomer reaction mixtures it is preferred to polymerize the reaction mixtures at temperatures such as 30–100° C., more preferably 50 to 80° C. or 60–70° C.

Silicone hydrogels of the instant invention have high oxygen permeability. They have $O_2$ Dk values between about 40 and 300 barrer determined by the polarographic method. Polarographic method measurements of oxygen permeability are made as follows. Lenses are positioned on the sensor then covered on the upper side with a mesh support. The oxygen which diffuses through the lens is measured using a polarographic oxygen sensor consisting of a 4 mm diameter gold cathode and a silver ring anode. The reference values are those measured on commercially available contact lenses using this method. Balafilcon A lenses available from Bausch & Lomb give a measurement of approximately 79 barrer (1 barrer=$10^{-10}$ ($cm^3$ of gas×$cm^2$)/($cm^3$ of polymer×s×cm Hg). Etafilcon A lenses give a measurement of about 20 to 25 barrer.

Contact lenses made from the silicone hydrogels of the invention may be produced to include a hydrophilic surface layer. Suitable materials for forming the surface layer are known in the art. Preferred materials include poly(vinyl alcohol), polyethylene oxide, poly(2-hydroxyethyl methacrylate), poly(methyl methacrylate), poly(acrylic acid), poly(methacrylic acid), poly(maleic acid), poly (itaconic acid), poly(acrylamide), poly(methacrylamide), poly(dimethylacrylamide), poly(glycerol methacrylate), polystyrene sulfonic acid, polysulfonate polymers, poly (vinyl pyrrolidone), carboxymethylated polymers, such as carboxymethylcellulose, polysaccharides, glucose amino glycans, polylactic acid, polyglycolic acid, block or random copolymers of the aforementioned, and the like, and mixtures thereof. Preferably, the carboxyl functional hydrophilic polymer is poly(acrylic acid), poly(methacrylic acid), poly (meth)acrylamide, or poly(acrylamide). More preferably, poly(acrylic acid) or poly(acrylamide) is used. Methods for coating contact lenses are disclosed in U.S. Pat. No. 6,087,415, and WO 00127662 incorporated herein in their entirety by reference.

The non-limiting examples below further describe this invention. In the examples the following abbreviations are used:

EXAMPLES

MBM 3-methacryloxypropylbis(trimethylsiloxy) methylsilane
MPD methacryloxypropylpentamethyl disiloxane
TRIS 3-methacryloxypropyltris (trimethylsiloxy) silane
DMA N,N-dimethylacrylamide
THF tetrahydrofuran
TMI dimethyl meta-isopropenyl benzyl isocyanate
HEMA 2-hydroxyethyl methacrylate
EGDMA tetraethyleneglycol dimethacrylate
EGDMA ethyleneglycol dimethacrylate
MMA methyl methacrylate
TBACB tetrabutyl ammonium-m-chlorobenzoate
mPDMS monomethacryloxypropyl terminated polydimethylsiloxane (MW 800–1000 unless otherwise indicated)
PDMS polydimethylsiloxane
3M3P 3-methyl-3-pentanol
Norbloc 2-(2'-hydroxy-5-methacrylyloxyethylphenyl)-2H-benzotriazole
CGI 1850 1:1 (wt) blend of 1-hydroxycyclohexyl phenyl ketone and bis(2,6-dimethoxybenzoyl)-2,4-4-trimethylpentyl phosphine oxide PAA poly (acrylic acid)
PVP poly(N-vinyl pyrrolidone)
IPA isopropyl alcohol
DAROCUR 1173 2-hydroxy-2-methyl-1-phenyl-propan-1-one
D3O 3,7-dimethyl-3-octanol
HOAc acetic acid
TAA t-amyl alcohol
blocked Hema 2-(trimethylsiloxy)ethyl methacrylate
Blue HEMA the reaction product of reactive blue number 4 and HEMA, as described in Example 4 or U.S. Pat. No. 5,944,853

PREPARATION 1—Preparation of Polysiloxane Macromer 500 grams of α,ω-bisaminopropyl polydimethylsiloxane (5000 MW) and 68 grams of glycidyl methacrylate were combined and heated with stirring at 100° C. for 10 hours. The product was extracted five times with 1500 ml of acetonitrile to remove residual glycidyl methacrylate to give a clear oil. IR: 3441, 2962, 1944, 1725, 1638, 1612, 1412 $cm^{-1}$. This product will be referred to as "Prep 1" or alternatively bis(N,N-bis-2-hydroxy-3-methacryloxypropyl) aminopropyl polydimethylsiloxane.

Example 1

38.2 parts by weight of the product of PREPARATION 1 was combined with 28.8 parts MBM, 33 parts DMA and 1 part DAROCUR 1173 and diluted with 3-methyl-3-pentanol to make a reaction mixture in which the diluent made up 9% of the mass of the complete reaction mixture. The resulting reaction mixture was a clear, homogeneous solution. Polypropylene contact lens molds were filled, closed and irradiated with a total of 3.2 $J/cm^2$ UV light from a fluorescent UV source over a 30-minute period. The molds were opened and the lenses were released into isopropanol and then transferred into deionized water.

The lenses were clear and had a tensile modulus of 205±12 psi, an elongation at break of 133±37%, and an equilibrium water content of 24.2±0.2%. Tensile properties were determined using an Instron™ model 1122 tensile tester (tensile modulus is equivalent to Young's modulus). Equilibrium Water Contents (EWC) were determined gravimetrically and are expressed as: % EWC=100×(mass of hydrated lens−mass of dry lens)/mass of hydrated lens

Examples 2–16

Reaction mixtures were made using the formulation of Example 1, but with amounts listed in Table 1. All reaction mixtures and lenses were clear.

TABLE 1

Silicone Hydrogel Formulations and Properties.

| Example | 1 | 2 | 3 | 4 |
|---|---|---|---|---|
| Composition | | | | |
| Prep 1 | 38.2 | 33.5 | 27.6 | 22.3 |
| MBM | 28.8 | 33.5 | 39.4 | 44.7 |
| DMA | 33 | 33 | 33 | 33 |
| Darocur 1173 | 0.4 | 0.4 | 0.4 | 0.4 |
| % of Diluent* | 9 | 7 | 5 | 4 |
| EWC(%) | 24.2 ± 0.2 | 23.3 ± 0.3 | 22.4 ± 0.2 | 24.2 ± 0.3 |
| Modulus(psi) | 205 ± 12 | 178 ± 11 | 136 ± 4 | 109 ± 3 |
| % Elongation | 133 ± 37 | 156 ± 39 | 168 ± 48 | 200 ± 58 |
| Dk (barrers) | 142.3 | 144.9 | 145.1 | 109.3 |

TABLE 1-continued

Silicone Hydrogel Formulations and Properties.

| Example | 5 | 6 | 7 | 8 |
|---|---|---|---|---|
| Composition | | | | |
| Prep 1 | 37.1 | 32.5 | 26.8 | 21.7 |
| MBM | 27.9 | 32.5 | 38.2 | 43.3 |
| DMA | 35 | 35 | 35 | 35 |
| Darocur 1173 | 0.4 | 0.4 | 0.4 | 0.4 |
| % of Diluent* | 10 | 7 | 5 | 11 |
| EWC(%) | 26.1 ± 0.3 | 25.8 ± 0.3 | 25.8 ± 0.3 | 25.8 ± 0.1 |
| Modulus(psi) | 179 ± 5 | 215 ± 7 | 132 ± 6 | 101 ± 4 |
| % Elongation | 151 ± 42 | 106 ± 30 | 195 ± 65 | 179 ± 47 |
| Dk (barrers) | 118.8 | 129.6 | 116.5 | 107.9 |

| Example | 9 | 10 | 11 | 12 |
|---|---|---|---|---|
| Composition | | | | |
| Prep 1 | 35.4 | 31 | 25.5 | 20.7 |
| MBM | 26.6 | 31 | 36.5 | 41.3 |
| DMA | 38 | 38 | 38 | 38 |
| Darocur 1173 | 0.4 | 0.4 | 0.4 | 0.4 |
| % of Diluent* | 12 | 7 | 7 | 5 |
| EWC(%) | 29.4 ± 0.3 | 30.0 ± 0.3 | 26.6 ± 0.2 | 26.7 ± 0.3 |
| Modulus(psi) | 215 ± 7 | 175 ± 7 | 132 ± 51 | 106 ± 4 |
| % Elongation | 99 ± 22 | 132 ± 40 | 166 ± 51 | 204 ± 55 |
| Dk (barrers) | 106.6 | 115.7 | 104.9 | 100.3 |

| Example | 13 | 14 | 15 | 16 |
|---|---|---|---|---|
| Composition | | | | |
| Prep 1 | 34.2 | 30 | 24.7 | 20 |
| MBM | 25.8 | 30 | 35.3 | 40 |
| DMA | 40 | 40 | 40 | 40 |
| Darocur 1173 | 0.4 | 0.4 | 0.4 | 0.4 |
| % of Diluent* | 12 | 11 | 8 | 9 |
| EWC(%) | 32.1 ± 0.1 | 31.2 ± 0.2 | 31.6 ± 0.3 | 31.7 ± 0.2 |
| Modulus(psi) | 218 ± 11 | 170 ± 6 | 131 ± 4 | 95 ± 3 |
| % Elongation | 110 ± 34 | 130 ± 51 | 185 ± 53 | 203 ± 47 |
| Dk (barrers) | 112.4 | 104.6 | 90.8 | 92.3 |

* % of the total reaction mixture of reactive components, and diluent.

Example 17

21.5% of α,ω-bismethacryloxypropyl polydimethylsiloxane with an average molecular weight of 5000 g/mol was combined with 42.5% MBM, 35% DMA and 1% DAROCUR 1173 and diluted with 3-methyl-3-pentanol to give a clear solution containing 22 weight % diluent. Lenses were made following the procedure of Example 1. The lens properties are shown in Table 2.

Example 18

Lenses were made using the procedure and reaction mixture described in Example 17, but with MPD in place of MBM. The lens properties are shown in Table 2.

Comparative Example 1

A reaction mixture was made using the formulation of Example 17, but with TRIS in place of MBM, and with 20% diluent. Lenses were made following the procedure of Example 1. The lens properties, shown in Table 2, show that the use of MBM (Example 17) or MPD (Example 18) gave lower moduli when used in place of TRIS.

TABLE 2

Compositions and Properties of Silicone Hydrogel Polymers.

|  | Example 17 | Comp. Ex. 1 | Example 18 |
|---|---|---|---|
| PDMS* | 21.5 | 21.5 | 21.5 |
| TRIS |  | 42.5 |  |
| MBM | 42.5 |  |  |
| MPD |  |  | 42.5 |
| DMA | 35 | 35 | 35 |
| Monomer/Diluent | 78/22 | 80/20 | 78/22 |
| Modulus | 65 ± 2 psi | 87 ± 3 psi | 55 ± 2 psi |
| Elongation at break | 278 ± 60% | 307 ± 88% | 263 ± 81% |
| Dk | 110 barrers | 147 barrers | 75.6 barrers |
| EWC | 28.2±0.3% | 28.9±0.3% | 31.0±0.3% |

PDMS* = α,ω-bismethacryloxypropyl polydimethylsiloxane, ave. MW of 5000 g/mol

Example 19

29.0% of α,ω-bismethacryloxypropyl polydimethylsiloxane with an average molecular weight of 5000 g/mol was combined with 35% mono-methacryloxypropyl terminated PDMS (T1, Structure II, MW=800 to 1000), 35% DMA and 1% DAROCUR 1173 and diluted with 3-methyl-3-pentanol to give a clear solution containing 23.0 weight % diluent. Lenses were made following the procedure of Example 1. The lens properties are shown in Table 3.

Example 20

29.0% of α,Ω-bismethacryloxypropyl polydimethylsiloxane with an average molecular weight of 5000 g/mol was combined with 35% (3-methacryloxy-2-hydroxypropyloxy) propylbis(trimethylsiloxy)methylsilane (T2), 35% DMA and 1% DAROCUR 1173 and diluted with 3M3P to give a clear solution containing 37.6 weight % diluent. Lenses were made following the procedure of Example 1. The lens properties are shown in Table 3.

TABLE 3

Compositions and Properties of Silicone Hydrogel Polymers.

|  | Example 19 | Example 20 |
|---|---|---|
| PDMS | 29.0 | 29.0 |
| T1 | 35.0 |  |
| T2 |  | 35.0 |
| DMA | 35.0 | 35.0 |
| DAROCUR 1173 | 1.0 | 1.0 |
| %/Diluent | 23.0 | 37.6 |
| Modulus | 193 ± 15 psi | 175 ± 11 psi |
| Elongation at break | 87.9 ± 42% | 108 ± 54% |
| Dk | 171 barrers | 94 barrers |
| EWC | 31.1±0.2% | 33.4±0.2% |

The Examples show that the contact lenses made using the silicone-containing monomers of Structure I provide contact lenses which are clear and have a lower Young's modulus than the contact lenses made according to the Comparative Examples. A low modulus is desirable to provide contact lenses which are comfortable when worn.

Example 21

The following compositions were prepared, and cured with UV light into flat sheets. These sheets were extracted with isopropanol to remove diluent and any unreacted monomer, then equilibrated in isotonic borate buffered saline.

|  | A* | B* | C* | D | E |
|---|---|---|---|---|---|
| PDMS 1000 MW | 11.41 g | 0 g | 0 g | 0 g | 0 g |
| PDMS 3000 MW | 0 g | 11.38 g | 0 g | 0 g | 0 g |
| TRIS | 0 g | 0 g | 11.38 g | 0 g | 0 g |
| mPDMS 1000 MW** | 0 g | 0 g | 0 g | 11.38 g | 0 g |
| mPDMS 5000 MW*** | 0 g | 0 g | 0 g | 0 g | 11.38 g |
| DMA | 6.13 g | 6.15 g | 6.13 g | 6.13 g | 6.13 g |
| EGDMA | 0 g | 0 g | 0.35 g | 0.37 g | 0.35 g |
| Darocur 1173 | 0.08 g | 0.08 g | 0.08 g | 0.08 g | 0.08 g |
| Diluent† | 7.50 g | 10.40 g | 7.50 g | 7.50 g | 15.42 g |

*For comparison, not according to the invention
**800–1000 MW was purchased from Gelest Inc. as "MCR-M11" brand mPDMS.
***5000 MW was purchased from Gelest Inc. as "MCR-M17" brand mPDMS.

The structure of PDMS was:

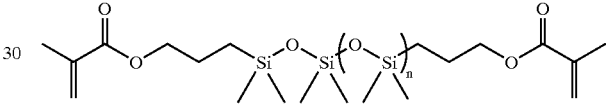

(Molecular weights for mPDMS and PDMS shown above are number average molecular weights).

The structure of mPDMS used in this example was:

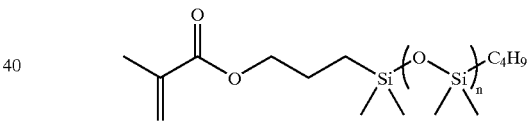

For the determination of the properties after hydration, the 25 mm diameter hydrogel disks (each approximately 0.7 mm thick) were held between the 25 mm diameter parallel plates (plated with a crystal clad 80/100 grit coating) of a controlled stress rheometer (ATS Stresstech) with a vertical force of 10 N. The disks were immersed in water during the test to prevent dehydration. A stress sweep from 100 to 10,000 Pa at 1 Hz and 25° C. was conducted on a disk of each material, to determine the range of the linear viscoelastic region for each formulation.

Once the limit of the linear viscoelastic region had been determined, the rheometer was set in frequency sweep mode using a stress less than the predetermined limit, and G', G", and tan δ of the 25 mm diameter hydrated disks were measured as a function of frequency from 0.01–30 Hz at several temperatures (10, 25, 40 and 55° C.), all the while maintaining a vertical force of 10 N on the hydrogel disks. The individual frequency scans of G' and tan δ were then combined to form master curves for each material. The data for the shear modulus G' and tan δ of the hydrogels at a reference temperature of 25° C. are shown in tables 4 and 5.

The shear modulus of sample A was greater than B in the frequency range in which they were tested (as would be expected since the only difference between them is the molecular weight between crosslinks: 1000 vs. 3000), and their shear moduli gradually increased with increasing frequency. At the high frequency extreme, sample A appeared to be approaching a transition, since the modulus appeared to be approaching a region of more rapid increase.

The tan δ of samples A and B were below 0.2 for the most part, with the tan δ of sample A increasing at the high frequencies in anticipation of a transition at higher frequencies.

Similarly, the shear modulus of sample D was greater than E in the frequency range in which they were tested (the only difference between them is the molecular weight of the dangling chains: 1000 vs. 5000), and their shear moduli gradually increased with increasing frequency.

The tan δ of samples D and E was below 0.1 for the entire frequency range in which they were tested, with the tan δ of sample E below that of sample D.

The shear modulus of sample C increased rapidly in the frequency range in which it was tested, indicating a transition from a rubbery to a more rigid state. The bulky TRIS moiety reduced the internal molecular mobility of the hydrogel (relative to the PDMS and mPDMS polymers), and caused the "glass" transition to shift to lower frequencies (=higher temperatures).

The tan δ of sample C reached a maximum at 100 Hz at the reference temperature of 40° C., indicative of the transition.

The addition of mPDMS was more effective than, the addition of di-capped PDMS in reducing the tan δ of the hydrogel. The elastic properties of a material were controlled by the judicious addition of mPDMS while maintaining the homogeneity of the material. On the other hand, the addition of TRIS increased the tan δ of a material.

TABLE 4

| Frequency (Hz) | G' (Pa) A | B | C | D | E |
|---|---|---|---|---|---|
| 30.0000 | 5.84E+05 | 2.89E+05 | 2.03E+06 | 3.41E+05 | 2.22E+05 |
| 20.0000 | 5.70E+05 | 2.92E+05 | 1.81E+06 | 3.43E+05 | 2.24E+05 |
| 15.0000 | 5.56E+05 | 2.92E+05 | 1.63E+06 | 3.42E+05 | 2.23E+05 |
| 10.0000 | 5.37E+05 | 2.90E+05 | 1.42E+06 | 3.39E+05 | 2.24E+05 |
| 9.0000 | 5.34E+05 | 2.89E+05 | 1.37E+06 | 3.37E+05 | 2.24E+05 |
| 8.0000 | 5.27E+05 | 2.89E+05 | 1.35E+06 | 3.38E+05 | 2.24E+05 |
| 6.9971 | 5.22E+05 | 2.88E+05 | 1.29E+06 | 3.38E+05 | 2.22E+05 |
| 6.0000 | 5.16E+05 | 2.86E+05 | 1.22E+06 | 3.35E+05 | 2.22E+05 |
| 5.0000 | 5.08E+05 | 2.85E+05 | 1.13E+06 | 3.34E+05 | 2.22E+05 |
| 4.0000 | 4.96E+05 | 2.82E+05 | 1.07E+06 | 3.31E+05 | 2.20E+05 |
| 3.0000 | 4.84E+05 | 2.81E+05 | 9.88E+05 | 3.28E+05 | 2.20E+05 |
| 2.0000 | 4.74E+05 | 2.76E+05 | 8.49E+05 | 3.24E+05 | 2.20E+05 |
| 1.5000 | 4.63E+05 | 2.73E+05 | 7.85E+05 | 3.21E+05 | 2.20E+05 |
| 1.0000 | 4.48E+05 | 2.71E+05 | 6.96E+05 | 3.16E+05 | 2.19E+05 |
| 0.9000 | 4.46E+05 | 2.70E+05 | 6.72E+05 | 3.18E+05 | 2.19E+05 |
| 0.8000 | 4.43E+05 | 2.69E+05 | 6.62E+05 | 3.15E+05 | 2.17E+05 |
| 0.7001 | 4.39E+05 | 2.68E+05 | 6.33E+05 | 3.12E+05 | 2.18E+05 |
| 0.6000 | 4.35E+05 | 2.65E+05 | 6.07E+05 | 3.12E+05 | 2.18E+05 |
| 0.5000 | 4.32E+05 | 2.65E+05 | 5.78E+05 | 3.10E+05 | 2.17E+05 |
| 0.4000 | 4.25E+05 | 2.62E+05 | 5.48E+05 | 3.07E+05 | 2.16E+05 |
| 0.3000 | 4.18E+05 | 2.60E+05 | 5.06E+05 | 3.06E+05 | 2.15E+05 |
| 0.2000 | 4.07E+05 | 2.58E+05 | 4.59E+05 | 3.01E+05 | 2.14E+05 |
| 0.1500 | 4.00E+05 | 2.56E+05 | 4.31E+05 | 2.99E+05 | 2.18E+05 |
| 0.1000 | 3.91E+05 | 2.53E+05 | 3.93E+05 | 2.94E+05 | 2.12E+05 |
| 0.0900 | 3.90E+05 | 2.54E+05 | 3.82E+05 | 2.94E+05 | 2.12E+05 |
| 0.0800 | 3.86E+05 | 2.52E+05 | 3.75E+05 | 2.91E+05 | 2.13E+05 |
| 0.0700 | 3.86E+05 | 2.52E+05 | 3.63E+05 | 2.90E+05 | 2.13E+05 |
| 0.0600 | 3.83E+05 | 2.51E+05 | 3.52E+05 | 2.89E+05 | 2.12E+05 |
| 0.0500 | 3.80E+05 | 2.50E+05 | 3.39E+05 | 2.87E+05 | 2.12E+05 |
| 0.0400 | 3.75E+05 | 2.49E+05 | 3.27E+05 | 2.88E+05 | 2.13E+05 |
| 0.0300 | 3.74E+05 | 2.49E+05 | 3.07E+05 | 2.83E+05 | 2.11E+05 |
| 0.0200 | 3.64E+05 | 2.44E+05 | 2.87E+05 | 2.79E+05 | 2.09E+05 |
| 0.0150 | 3.60E+05 | 2.44E+05 | 2.76E+05 | 2.75E+05 | 2.07E+05 |
| 0.0100 | 3.53E+05 | 2.41E+05 | 2.58E+05 | 2.71E+05 | 2.08E+05 |

TABLE 5

| Frequency (Hz) | tan δ A | B | C | D | E |
|---|---|---|---|---|---|
| 30.0000 | 0.2371 | 0.1084 | 0.5259 | 0.1025 | 0.0500 |
| 20.0000 | 0.2107 | 0.0964 | 0.5392 | 0.0869 | 0.0394 |
| 15.0000 | 0.1925 | 0.0917 | 0.5584 | 0.0767 | 0.0347 |
| 10.0000 | 0.1804 | 0.0917 | 0.5664 | 0.0725 | 0.0326 |
| 9.0000 | 0.1690 | 0.0877 | 0.5745 | 0.0671 | 0.0270 |
| 8.0000 | 0.1622 | 0.0871 | 0.5540 | 0.0704 | 0.0290 |
| 6.9971 | 0.1631 | 0.0876 | 0.5534 | 0.0702 | 0.0240 |
| 6.0000 | 0.1594 | 0.0883 | 0.5381 | 0.0682 | 0.0298 |
| 5.0000 | 0.1538 | 0.0872 | 0.5690 | 0.0656 | 0.0260 |
| 4.0000 | 0.1471 | 0.0839 | 0.5568 | 0.0635 | 0.0284 |
| 3.0000 | 0.1461 | 0.0879 | 0.5192 | 0.0633 | 0.0226 |
| 2.0000 | 0.1472 | 0.0902 | 0.5352 | 0.0607 | 0.0240 |
| 1.5000 | 0.1219 | 0.0892 | 0.5221 | 0.0654 | 0.0172 |
| 1.0000 | 0.1199 | 0.0953 | 0.5070 | 0.0648 | 0.0259 |
| 0.9000 | 0.1209 | 0.0915 | 0.4974 | 0.0553 | 0.0242 |
| 0.8000 | 0.1294 | 0.0978 | 0.4892 | 0.0601 | 0.0267 |
| 0.7001 | 0.1230 | 0.0898 | 0.4852 | 0.0647 | 0.0260 |
| 0.6000 | 0.1160 | 0.0953 | 0.4742 | 0.0640 | 0.0310 |
| 0.5000 | 0.1096 | 0.0939 | 0.4754 | 0.0664 | 0.0150 |
| 0.4000 | 0.1133 | 0.0969 | 0.4641 | 0.0626 | 0.0254 |
| 0.3000 | 0.1113 | 0.0976 | 0.4469 | 0.0651 | 0.0147 |
| 0.2000 | 0.1083 | 0.1019 | 0.4256 | 0.0653 | 0.0270 |
| 0.1500 | 0.1067 | 0.1047 | 0.4039 | 0.0699 | 0.0244 |
| 0.1000 | 0.1039 | 0.1066 | 0.3895 | 0.0744 | 0.0277 |
| 0.0900 | 0.1045 | 0.1084 | 0.3848 | 0.0761 | 0.0300 |
| 0.0800 | 0.1042 | 0.1066 | 0.3831 | 0.0774 | 0.0234 |
| 0.0700 | 0.0988 | 0.1076 | 0.3749 | 0.0709 | 0.0155 |
| 0.0600 | 0.0969 | 0.1112 | 0.3705 | 0.0755 | 0.0262 |
| 0.0500 | 0.1024 | 0.1137 | 0.3496 | 0.0765 | 0.0209 |
| 0.0400 | 0.0887 | 0.1117 | 0.3349 | 0.0782 | 0.0257 |
| 0.0300 | 0.0914 | 0.1160 | 0.3282 | 0.0830 | 0.0322 |
| 0.0200 | 0.1060 | 0.1185 | 0.3248 | 0.0792 | 0.0241 |
| 0.0150 | 0.1038 | 0.1270 | 0.2978 | 0.0753 | 0.0391 |
| 0.0100 | 0.1038 | 0.1326 | 0.2800 | 0.0846 | 0.0285 |

Example 22

SEALs Study

A double masked, contralateral, randomized, complete block clinical study was conducted to determine the relationship between SEALs and the Young's modulus of contact lenses. Lenses were made from two different silicone hydrogel compositions as follows.

TABLE 6

| Component | Lens A (Wt %) | Lens B(Wt %) |
|---|---|---|
| Silicone based macromer | 17.98 | 17.98 |
| TRIS | 21 | 14 |
| mPDMS | 21 | 28 |
| DMA | 25.5 | 26 |
| blocked HEMA | 5 | 5 |
| PVP K90 | 5 | 5 |
| TEGDMA | 1.5 | 1 |

The silicone-based macromer refers to a prepolymer in which one mole was made from an average of 19.1 moles of 2-hydroxyethyl methacrylate, 2.8 moles of methyl methacrylate, 7.9 moles of methacryloxypropyltris (trimethylsiloxy)silane, and 3.3 moles of mono-methacryloxypropyl terminated mono-butyl terminated polydimethylsiloxane. The macromer was completed by reacting the aforementioned material with 2.0 moles per mole of 3-isopropenyl-ω,ω-dimethylbenzyl isocyanate using dibutyltin dilaurate as a catalyst.

Weight percentages are computed based on the total weight of all components; the balance of the compositions in Table 5 comprise initiators and additives.

Lenses were made from these compositions having a nominal base curve of 8.5 mm and a diameter of 14.0 mm at 22° C. They had a nominal center thickness of 0.110 mm and a measured center thickness of 0.119 mm (Lens A) and 0.085 mm (Lens B). Both lenses were coated with a hydrophilic coating (PM as in Example 37). Lens A had a Young's modulus of 109.4 psi and Lens B had a Young's modulus of 88.5 psi.

Subjects participating in the study were given a baseline examination and fitted with lenses made from the compositions shown in Table 6. They then wore the lenses for one week. Lenses were worn for daily wear. The subjects returned for a clinical evaluation of the presence of SEALs and other clinical data (e.g. visual acuity). Nineteen subjects (38 eyes) completed the study, eight of whom had a history of SEALs. Ten (10) eyes wearing Lens A exhibited SEALs. No eyes wearing Lens B exhibited SEALs.

Example 23

SEALs Study

A study similar to that of Example 22 was conducted using lenses of different center thicknesses. The lenses had the following characteristics and gave the results shown in Table 7. In Table 7, column 4, "E" represents Young's modulus and "CT" represents the center thickness.

TABLE 7

| Lens Type | Modulus (psi) | CT ($\mu$m) | $E(CT)^2$ (psi·mm2) | SEALs (%) |
|---|---|---|---|---|
| Etafilcon | 40 | 110 | 0.48 | 1 |
| Lens A* | 110 | 124 | 1.69 | 10 |
| Lens B* | 88 | 105 | 0.97 | 0 |
| Lens B* | 88 | 170 | 2.54 | 24 |
| Lotrafilcon A | 238 | 80 | 1.52 | 5 |
| Balafilcon A | 155 | 90 | 1.26 | 5 |

*Refers to lens composition corresponding to Example 22.

This examples shows the combined effect of lens center thickness and modulus on SEALs.

Example 24

(Prophetic)

A set of lens characteristics is established for lenses that will not result in SEALs. This is accomplished by comparing the relative deflection ($k(Et^2)^{-1}$, where k=constant, E=Young's modulus, and t=center thickness of lenses having different moduli with those of the moduli and thicknesses of the lenses of Example 22 that did not induce SEALs. This range is used to establish mPDMS concentration ranges that will result in lenses whose use will not induce SEALs.

| E (psi) | Thickness ($\mu$m) | [mPDMS](wt %)* |
|---|---|---|
| 45 | <149 | 40 |
| 60 | <129 | 30 |
| 100 | <100 | 20 |
| 130 | <88 | 5 |

*mPDMS concentration based on a composition comprised of the components of Lenses B in Example 22. One skilled in the art will recognize adjustments in mPDMS concentration when the lens is based on silicone hydrogels comprising additional or alternative components.

Example 25

(GTP Macromer Preparation)

Macromer A:

To a dry container housed in a dry box under nitrogen at ambient temperature was added 30.0 g (0.277 mol) of bis(dimethylamino)methylsilane, a solution of 13.75 ml of a 1 M solution of TBACB (386.0 g TBACB in 1000 ml dry THF), 61.39 g (0.578 mol) of p-xylene, 154.28 g (1.541 mol) methyl methacrylate (1.4 equivalents relative to initiator), 1892.13 (9.352 mol) 2-(trimethylsiloxy)ethyl methacrylate (8.5 equivalents relative to initiator) and 4399.78 g (61.01 mol) of THF. To a dry, three-necked, round-bottomed flask equipped with a thermocouple and condenser, all connected to a nitrogen source, was charged the above mixture prepared in the dry box.

The reaction mixture was cooled to 15° C. while stirring and purging with nitrogen. After the solution reaches 15° C., 191.75 g (1.100 mol) of 1-trimethylsiloxy-1-methoxy-2-methylpropene (1 equivalent) was injected into the reaction vessel. The reaction was allowed to exotherm to approximately 62° C. and then 30 ml of a 0.40 M solution of 154.4 g TBACB in 11 ml of dry THF was metered in throughout the remainder of the reaction. After the temperature of reaction reached 30° C. and the metering began, a solution of 467.56 g (2.311 mol) 2-(trimethylsiloxy)ethyl methacrylate (2.1 equivalents relative to the initiator), 3636.6. g (3.463 mol) n-butyl monomethacryloxypropyl-polydimethylsiloxane (3.2 equivalents relative to the initiator), 3673.84 g (8.689 mol) TRIS (7.9 equivalents relative to the initiator) and 20.0 g bis(dimethylamino) methylsilane was added.

The mixture was allowed to exotherm to approximately 38–42° C. and then allowed to cool to 30° C. At that time, a solution of 10.0 g (0.076 mol) bis(dimethylamino) methylsilane, 154.26 g (1.541 mol) methyl methacrylate (1.4 equivalents relative to the initiator) and 1892.13 g (9.352 mol) 2-trimethylsiloxy)ethyl methacrylate (8.5 equivalents relative to the initiator) was added and the mixture again allowed to exotherm to approximately 40° C. The reaction temperature dropped to approximately 30° C. and 2 gallons of THF were added to decrease the viscosity. A solution of 439.69 g water, 740.6 g methanol and 8.8 g (0.068 mol) dichloroacetic acid was added and the mixture refluxed for 4.5 hours to de-block the protecting groups on the HEMA. Volatiles were then removed and toluene added to aid in removal of the water until a vapor temperature of 110° C. was reached.

The reaction flask was maintained at approximately 110° C. and a solution of 443 g (2.201 mol) TMI and 5.7 g (0.010 mol) dibutyltin dilaurate were added. The mixture was reacted until the isocyanate peak was gone by IR. The toluene was evaporated under reduced pressure to yield an off-white, anhydrous, waxy reactive monomer. The macromer was placed into acetone at a weight basis of approximately 2:1 acetone to macromer. After 24 hrs, water was added to precipitate out the macromer and the macromer was filtered and dried using a vacuum oven between 45 and 60° C. for 20–30 hrs.

Macromer B:

The procedure for Macromer A used except that 19.1 mole parts HEMA, 5.0 mole parts MAA, 2.8 mole parts MMA; 7.9 mole parts TRIS, 3.3, mole parts mPDMS, and 2.0 mole parts TMI were used.

Macromer C:

The procedure for Macromer A was used except that 19.1 mole parts HEMA, 7.9 mole parts TRIS, 3.3 mole parts mPDMS, and 2.0 mole parts TMI were used.

Examples 26–36

(Lens Formation)

Hydrogel were made from the monomer mixtures shown on Table 8. All amounts are calculated as weight percent of the total weight of the combination with the balance of the mixture being minor amounts of additives. Polymerization was conducted in the presence of the diluents listed.

Contact lenses were formed by adding about 0.10 g of the monomer mix to the cavity of an eight cavity lens mold of the type described in U.S. Pat. No. 4,640,489 and curing for 1200 sec. Polymerization occurred under a nitrogen purge and was photoinitiated with visible light generated with a Philips TL 20W/03T fluorescent bulb. After curing, the molds were opened, and the lenses were either released in a 1:1 blend of water and ethanol, then leached in ethanol to remove any residual monomers and diluent, or released in a 60% IPA/water, then leached in IPA/DI to remove any residual monomers and diluent. Finally the lenses were equilibrated in physiological borate-buffered saline. The lenses had the properties described in Table 8

TABLE 8

| | EXAMPLE | | | | | | | | | | |
|---|---|---|---|---|---|---|---|---|---|---|---|
| | 26 | 27 | 28 | 29 | 30 | 31 | 32 | 33 | 34 | 35 | 36 |
| Macromer | B | A | A | C | C | A | A | A | A | A | A |
| Macromer | 30.00 | 17.98 | 25.00 | 60.00 | 20.00 | 17.98 | 17.98 | 19.98 | 17.98 | 17.98 | 19.98 |
| TRIS | 0.00 | 14.00 | 18.00 | 0.00 | 40.00 | 21.00 | 21.00 | 8.00 | 20.00 | 25.00 | 20.00 |
| DMA | 27.00 | 26.00 | 28.00 | 36.00 | 36.00 | 25.50 | 25.50 | 26.00 | 26.00 | 22.00 | 23.00 |
| MPDMS | 39.00 | 28.00 | 18.00 | 0.00 | 0.00 | 21.00 | 21.00 | 28.50 | 25.50 | 30.00 | 28.50 |
| Norbloc | 2.00 | 2.00 | 2.00 | 3.00 | 3.00 | 2.00 | 2.00 | 2.00 | 2.00 | 2.00 | 2.00 |
| CGI 1850 | 2.00 | 1.00 | 1.00 | 1.00 | 1.00 | 1.00 | 1.00 | 1.00 | 1.00 | 1.00 | 1.00 |
| TEGDMA | 0.00 | 1.00 | 0.00 | 0.00 | 0.00 | 1.50 | 1.50 | 1.50 | 1.50 | 0.50 | 1.50 |
| HEMA | 0.00 | 5.00 | 0.00 | 0.00 | 0.00 | 5.00 | 5.00 | 5.00 | 5.00 | 7.00 | 5.00 |
| Blue HEMA | 0.00 | 0.02 | 0.00 | 0.00 | 0.00 | 0.02 | 0.02 | 0.02 | 0.02 | 0.02 | 0.02 |
| PVP (K90) | 0.00 | 5.00 | 8.00 | 0.00 | 0.00 | 5.00 | 5.00 | 8.00 | 5.00 | 7.50 | 9.00 |
| Diluent % | 41 | 20 | 20 | 20 | None | 20 | 50.00 | 37.50 | 20.00 | 40.00 | 50.00 |
| Diluent | 3M3P | *D3O | 3M3P | 3M3P | NA | D3O | TAA | 3M3P | ethyl lactate | 3M3P | 3M3P |
| % EWC | 49.2 | 39.1 | 48.5 | 40.9 | 37.1 | | | | | | |
| Modulus (psi) | 73 | 85.3 | 59 | 273 | 102 | | | | | | |
| % Elongation | 200 | 251 | 261 | 74 | 384 | | | | | | |
| Dk (edge corrected) | 109.4 | 109 | 97.9 | 34.5 | 79.8 | | | | | | |

*With 5% HOAc added

Example 37

To lenses from Example 27 immersed in a solution of 1.0% 250,000 Mw polyacrylic acid in water at 45° C. was added 0.1% 1-[3-(dimethylamino)propyl]-3-ethylcarbodiimide hydrochloride. After stirring for 30 minutes the lenses are rinsed in borate-buffered saline solution. The dynamic contact angles of the resulting poly(sodium acrylate)-coated lenses are 44° advancing and 42° receding.

Comparative Example 2

Lenses were made by curing a blend of 57.5% TRIS, 40.0% DMA, 1.5% 1,3-bis(3-methacryloxypropyl)tetrakis(trimethylsiloxy)disiloxane and 1.0% 2-hydroxy-2-methyl-1-phenyl-propan-1-one (by weight) in contact lens molds under UV light. The lenses were released into ethanol and transferred to borate-buffered saline solution. The lenses had properties given in Table 9, but when extended they returned to their original shape very slowly due to their high tan δ. In fact, even during ordinary lens handling, these lenses typically did not retain a their symmetrical shape. Further, they had less than desirable Dks and were very unwettable.

TABLE 9

Properties of Lenses From Comparative Example 2.

| | |
|---|---|
| Tensile Modulus (psi) | 67 |
| Elongation at break (%) | 674 |
| Water Content (%) | 40.2 |
| Edge corrected Dk (barrers) | 70.2 |

We claim:

1. A contact lens comprising a silicone hydrogel comprising a mono-alkyl terminated polydiorganosiloxane having the structure:

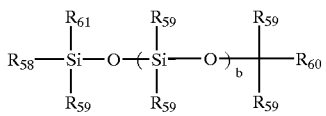

where b=0 to 100; $R_{58}$ is a monovalent group comprising at least one ethylenically unsaturated moiety; each $R_{59}$ is independently a monovalent alkyl, or aryl group, which may be further substituted with alcohol, amine, ketone, carboxylic acid or ether groups; $R_{60}$ is a monovalent alkyl, or aryl group, which may be further substituted with alcohol, amine, ketone, carboxylic acid or ether groups, and $R_{61}$ is independently alkyl or aromatic, or a monovalent siloxane chain comprising from 1 to 100 repeating Si—O units; wherein said silicone hydrogel comprises a Young's modulus less than about 180 psi and a tan δ of equal to or less than about 0.25 at a frequency of 1 Hz at 25° C., provided that said mono-alkyl terminated polydiorganosiloxane is not a hydroxyalkylamine-functional silicone-containing monomer.

2. The contact lens of claim 1, wherein said silicone hydrogel has a Young's modulus of less than about 100 psi.

3. The contact lens of claim 1, wherein said silicone hydrogel further comprises an $O_2$ Dk greater than about 40 barrer.

4. The contact lens of claims 1, 2, or 3, wherein said silicone hydrogel comprises about 2–70% wt of said mono-alkyl terminated polydiorganosiloxane, based on the total weight of reactive monomer.

5. The contact lens of claim 1, wherein b=4 to 16, $R_{58}$ is a monovalent group containing at least one styryl, vinyl, or methacrylate moiety, each $R_{59}$ is methyl, $R_{60}$ is $C_{3-8}$ alkyl group, and $R_{61}$ is methyl.

6. The contact lens of claim 1, wherein b=8 to 10, $R_{58}$ is a methacrylate moiety; each $R_{59}$ is methyl, $R_{60}$ is a butyl group, and $R_{61}$ is methyl.

7. The contact lens of claim 1, wherein the mono-alkyl terminated polydiorganosiloxane is a monomethacryloxypropyl terminated polydimethylsiloxane.

8. The contact lens of claim 1, wherein said silicone hydrogel has a Young's modulus of about 30–160 psi.

9. The contact lens of claim 1, wherein said silicone hydrogel has a Young's modulus of about 40–130 psi.

10. The contact lens of claim 1, further comprising a surface layer that is more hydrophilic than said silicone hydrogel.

11. The contact lens of claim 10, further comprising a coating that is more hydrophilic than said silicone hydrogel.

12. The contact lens of claim 10, wherein the surface layer comprises poly(acrylic acid).

13. A silicone hydrogel contact lens comprising a (CT) of about 50 to about 160 μm and a Young's modulus (B) of about 40 to about 300 psi, wherein $(E)(CT)^2$ is less than about 1 psi·mm² wherein said silicone hydrogel comprises a mono-alkyl terminated polydiorganosiloxane having the structure:

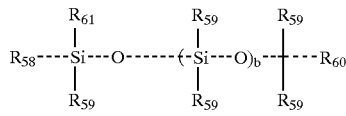

where b=0 to 100; $R_{58}$ is a monovalent group comprising at least one ethylenically unsaturated moiety; each $R_{59}$ is independently a monovalent alkyl, or aryl group, which may be further substituted with alcohol, amine, ketone, carboxylic acid or ether groups; $R_{60}$ is a monovalent alkyl, or aryl group, which may be further substituted with alcohol, amine, ketone, carboxylic acid or ether groups, and $R_{61}$ is independently alkyl or aromatic, or a monovalent siloxane chain comprising from 1 to 100 repeating Si—O units, provided that said mono-alkyl terminated polydiorganosiloxane is not a hydroxyalkylamine-functional silicone-containing monomer.

14. The silicone hydrogel contact lens of claim 13, further comprising a tan δ of equal to or less than about 0.3 at a frequency of 1 Hz at 25° C.

15. The silicone hydrogel contact lens of claim 13, further comprising a $O_2$Dk greater than about 40 barrer.

16. The silicone hydrogel contact lens of claim 13, 14, or 15, comprising at least 5% wt of said mono-alkyl terminated polydiorganosiloxane.

17. The silicone hydrogel contact lens of claim 13, wherein b=4 to 16, $R_{58}$ is a monovalent group containing at least one styryl, vinyl, or methacrylate moiety, each $R_{59}$ is methyl, and $R_{60}$ is $C_{3-8}$ alkyl group.

18. The silicone hydrogel contact lens of claim 13, wherein b=8 to 10, $R_{58}$ is a methacrylate moiety; each $R_{59}$ is methyl; $R_{60}$ is a butyl group, and $R_{61}$ is methyl.

19. The silicone hydrogel contact lens of claim 13, wherein the mono-alkyl terminated polydiorganosiloxane is a monomethacryloxypropyl terminated polydimethylsiloxane.

20. The silicone hydrogel contact lens of claim 13, wherein the center thickness is less than about 85 μm.

21. The silicone hydrogel contact lens of claim 13, wherein the center thickness is less than about 100 μm and the Young's modulus is less than about 100 psi.

22. The silicone contact lens of claim 13, wherein the amount of mono-alkyl terminated polydiorganosiloxane is about 20% wt.

23. The silicone hydrogel contact lens of claim 13, wherein the center thickness is less than 129 μm and the Young's modulus is less than about 60 psi.

24. The silicone hydrogel contact lens of claim 13, wherein the amount of mono-alkyl terminated polydiorganosiloxane is about 30% wt.

* * * * *